US012571876B2

(12) United States Patent
Jiang et al.

(10) Patent No.: US 12,571,876 B2
(45) Date of Patent: Mar. 10, 2026

(54) POSITIONING METHOD, DEVICE, ROBOT AND READABLE STORAGE MEDIUM

(71) Applicant: BEIJING XIAOMI MOBILE SOFTWARE CO., LTD., Beijing (CN)

(72) Inventors: Xiaolei Jiang, Beijing (CN); Yaxu Kong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 252 days.

(21) Appl. No.: 18/243,644

(22) Filed: Sep. 7, 2023

(65) Prior Publication Data

US 2024/0175973 A1 May 30, 2024

(30) Foreign Application Priority Data

Nov. 30, 2022 (CN) .......................... 202211528773.8

(51) Int. Cl.
  *G01S 5/10* (2006.01)
  *G01S 5/02* (2010.01)
(52) U.S. Cl.
  CPC .............. *G01S 5/10* (2013.01); *G01S 5/0264* (2020.05)
(58) Field of Classification Search
  CPC ................................ G01S 5/10; G01S 5/0264
  USPC ......................................................... 342/465
  See application file for complete search history.

(56) References Cited

U.S. PATENT DOCUMENTS

| 2014/0159954 A1 | 6/2014 | Stoddard |
| 2018/0024220 A1 | 1/2018 | Massarella et al. |

FOREIGN PATENT DOCUMENTS

| CN | 104539347 A | | 4/2015 | |
| CN | 106611969 A | * | 5/2017 | |
| CN | 112637780 A | * | 4/2021 | .............. H04W 4/33 |
| EP | 3309641 B1 | | 12/2019 | |
| EP | 4181536 A1 | | 5/2023 | |
| JP | S54119894 A | | 9/1979 | |
| KR | 102559770 B1 | * | 7/2023 | ........... G01S 5/0263 |
| WO | 2022036859 A1 | | 2/2022 | |

OTHER PUBLICATIONS

Partial European Search Report issued in Application No. 23198448.5 dated Mar. 20, 2024,(15p).
The Extended European Search Report issued in Application No. 23198448.5 dated Jul. 24, 2024, (20p).

* cited by examiner

*Primary Examiner* — Harry K Liu
(74) *Attorney, Agent, or Firm* — Arch & Lake LLP; Hao Tan; Shen Wang

(57) ABSTRACT

The present disclosure provides a positioning method and device, a robot, and a readable storage medium. The method includes: acquiring a positioning parameter collected by each positioning module and an RSSI difference between positioning modules in each set, and determining a target positioning module based on positioning parameters collected by a set of positioning modules with a largest RSSI difference, to determine a relative positional relationship between the robot and a target device.

20 Claims, 6 Drawing Sheets

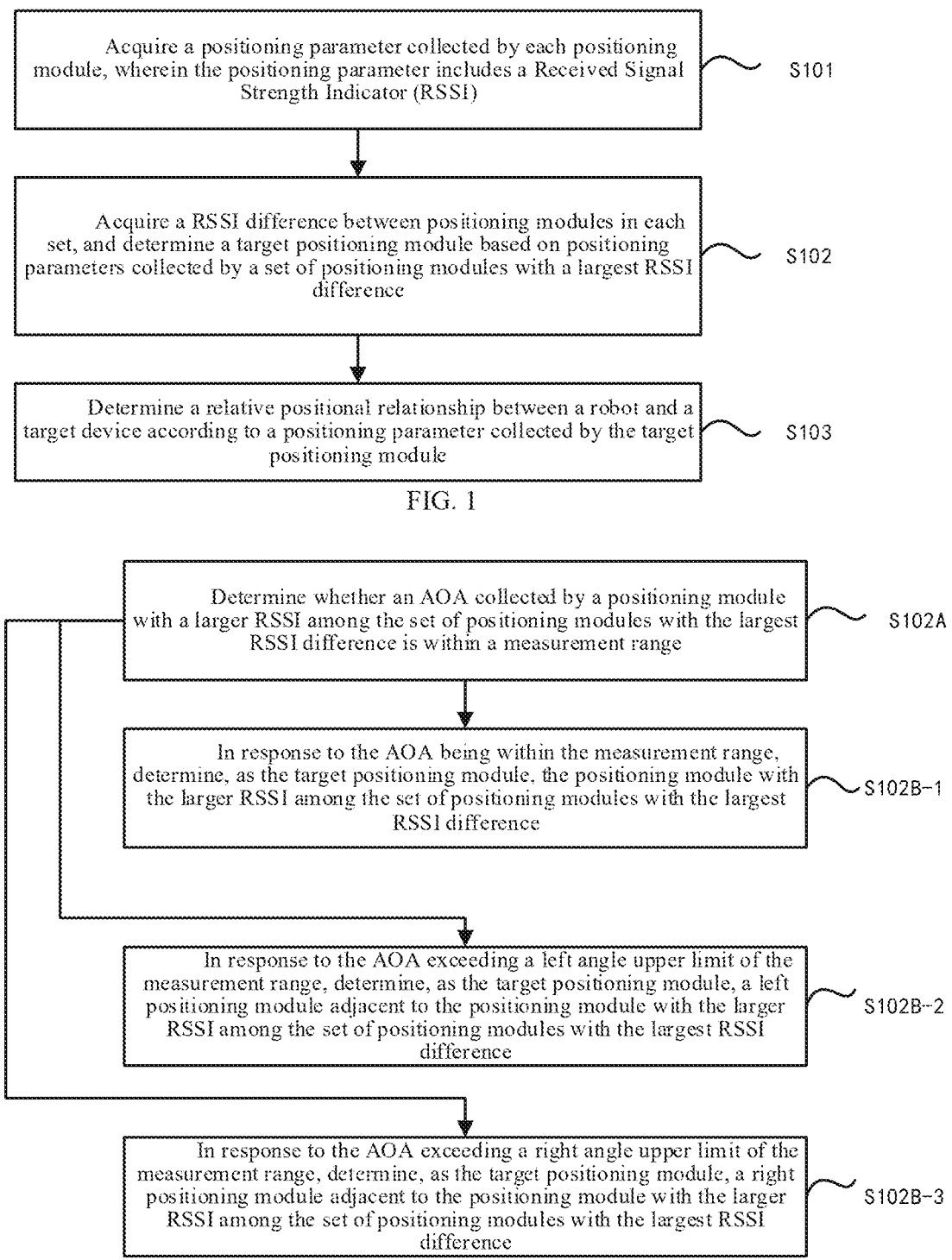

Acquire a positioning parameter collected by each positioning module, wherein the positioning parameter includes a Received Signal Strength Indicator (RSSI) — S101

Acquire a RSSI difference between positioning modules in each set, and determine a target positioning module based on positioning parameters collected by a set of positioning modules with a largest RSSI difference — S102

Determine a relative positional relationship between a robot and a target device according to a positioning parameter collected by the target positioning module — S103

FIG. 1

Determine whether an AOA collected by a positioning module with a larger RSSI among the set of positioning modules with the largest RSSI difference is within a measurement range — S102A In response to the AOA being within the measurement range, determine, as the target positioning module, the positioning module with the larger RSSI among the set of positioning modules with the largest RSSI difference — S102B-1

In response to the AOA exceeding a left angle upper limit of the measurement range, determine, as the target positioning module, a left positioning module adjacent to the positioning module with the larger RSSI among the set of positioning modules with the largest RSSI difference — S102B-2

In response to the AOA exceeding a right angle upper limit of the measurement range, determine, as the target positioning module, a right positioning module adjacent to the positioning module with the larger RSSI among the set of positioning modules with the largest RSSI difference — S102B-3

FIG. 2

```
+----------------------------------------------+
| robot                                        |
|                                              |
|        +------------------------------+      |
|        |        positioner            |      |
|        +------------------------------+      |
|                                              |
+----------------------------------------------+
```

FIG. 7

POSITIONING METHOD, DEVICE, ROBOT AND READABLE STORAGE MEDIUM

CROSS-REFERENCE

The present application is based upon and claims priority to Chinese Patent Application No. 202211528773.8, filed on Nov. 30, 2022, the entire contents of which are incorporated herein by reference for all purposes.

TECHNICAL FIELD

The present disclosure relates to the field of robot technologies, and in particular, to a positioning method, a device, a robot and a readable storage medium.

BACKGROUND

With the advancement of robot technologies, precision requirements for robot positioning are also continuously improved. At present, robots typically obtain positional relationships between the robots and to-be-positioned target devices based on depth cameras or a single positioning module.

SUMMARY

The present disclosure provides a positioning method, a device, a robot and a readable storage medium.

According to a first aspect of the present disclosure, there is provided a positioning method, which is applied to a robot. A plurality of sets of positioning modules opposite to each other are provided around the robot, and the positioning module is provided with a directional antenna, and maintains an interactive connection with a target device based on a positioning parameter. The method includes:

acquiring a positioning parameter collected by each positioning module, wherein the positioning parameter includes a Received Signal Strength Indicator (RSSI);

acquiring an RSSI difference between positioning modules in each set, and determining a target positioning module based on positioning parameters collected by a set of positioning modules with a largest RSSI difference; and determining a relative positional relationship between the robot and the target device according to a positioning parameter collected by the target positioning module.

According to a second aspect of the present disclosure, there is provided a robot, including:

a memory, configured to store executable instructions of processor; and a processor, configured to execute the executable instructions in the memory to implement steps of the method in any implementation of the first aspect as described above.

According to a third aspect of the present disclosure, there is provided a computer-readable storage medium having a computer program stored thereon which, when executed by a processor, implements steps of the method in any implementation of the first aspect as described above.

It should be noted that the above general description and the following detailed description are merely illustrative and explanatory and should not be construed as limiting of the disclosure.

BRIEF DESCRIPTION OF THE DRAWINGS

The accompanying drawings, which are incorporated in and constitute a part of the specification, illustrate embodiments consistent with the present disclosure and, together with the description, serve to explain principles of the present disclosure.

FIG. 1 is a flowchart showing a positioning method according to an embodiment of the present disclosure;

FIG. 2 is a flowchart showing another positioning method according to an embodiment of the present disclosure;

FIG. 7 is schematic structural diagram showing a robot according to an embodiment of the present disclosure.

DETAILED DESCRIPTION

Figure 3:
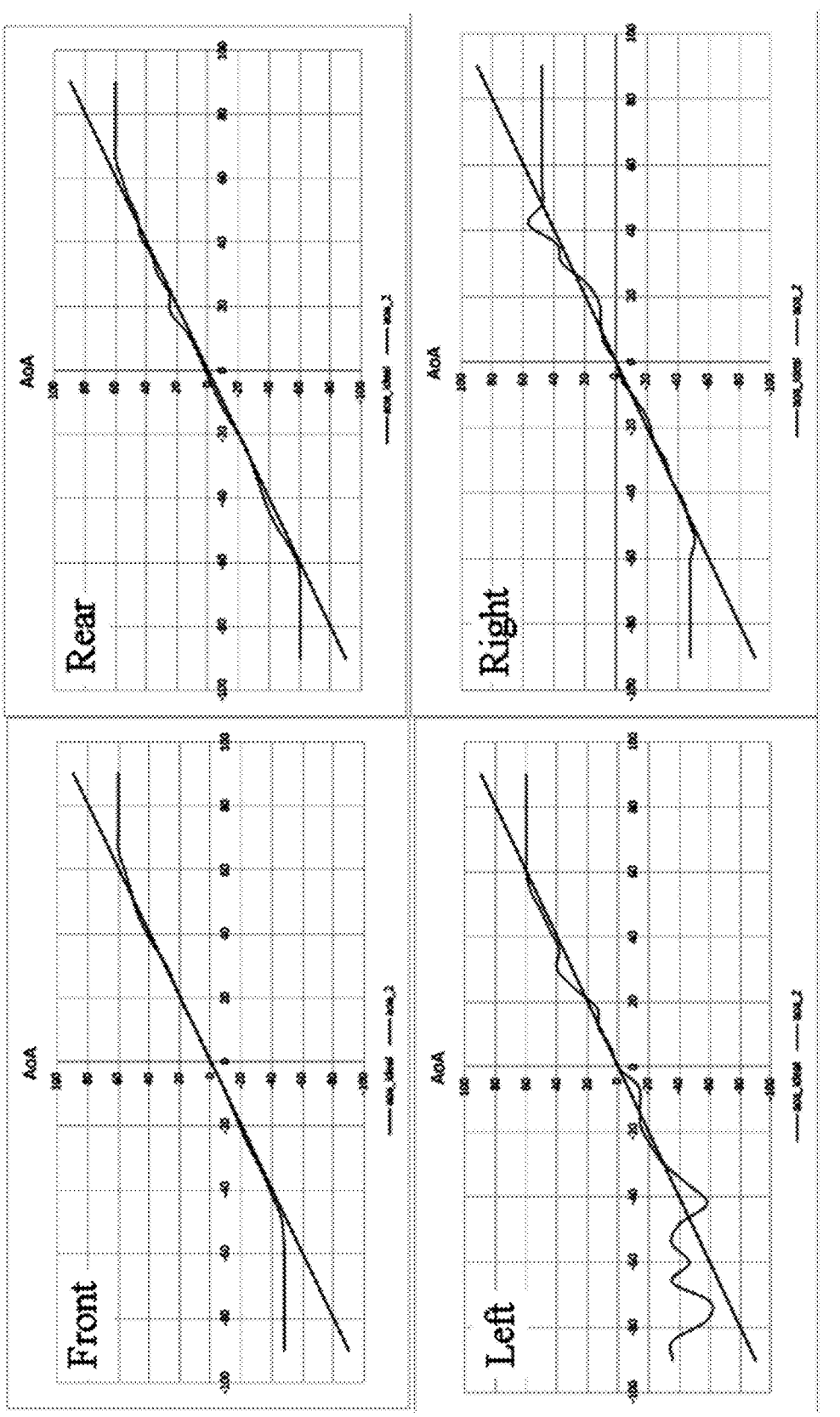
FIG. 3 is a schematic diagram showing an AOA accuracy according to an embodiment of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with some aspects related to the present disclosure as recited in the appended claims.

The terms used in the present disclosure are merely for the purpose of describing particular embodiments and are not intended to limit the present disclosure. As used in the present disclosure and the appended claims, the singular forms "a," "the," and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "upon" or "when" or "in response to determination."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A method described in the present disclosure is applied to a robot. A plurality of sets of positioning modules (which may also called positioners) opposite to each other are provided around the robot, which the plurality of sets mean two or more sets, such as a front positioning module and a rear positioning module corresponding to each other, a left positioning module and a right positioning module corresponding to each other, etc. The positioning module is provided with a directional antenna, so that the positioning module has a directional positioning capability for a to-be-positioned target device. Please note that the positioning module may be a sensor, such as a lidar sensor, a camera, or any other sensors provide positioning or location information.

The target device is a positioning target object of the positioning module, and maintains an interactive connection (such as an Out-Of-Band (OOB) connection) with the positioning module. Illustratively, the target device may include a positioning remote control, so as to enable the robot to perform a tracking or positioning operation for the positioning remote control. In addition, the target device may further include a charging pile, so that the robot automatically connects to the charging pile after positioning the charging pile.

FIG. 1 shows a flowchart of a positioning method according to an embodiment of the present disclosure.

In step S101, a positioning parameter collected by each positioning module is acquired, and the positioning parameter includes a Received Signal Strength Indicator (RSSI).

In an example, an Ultra-Wideband (UWB) chip may be disposed on a PCB circuit board to form a UWB module, so as to form the positioning module.

Each positioning module maintains an interactive connection with a target device based on the positioning parameter. The positioning parameter includes a ranging signal (such as an UWB ranging signal) collected by the positioning module from the target device, an Angle of Arrival (AOA) between the target device and a forward direction of the positioning module, etc., which is not limited by the present disclosure.

In step S102, an RSSI difference between positioning modules in each set is acquired, and a target positioning module is determined based on positioning parameters collected by a set of positioning modules with the largest RSSI difference.

The RSSI collected by each positioning module is related to its positional relationship with the target device. For example, when the target device is located directly in front of the robot, an RSSI collected by a positioning module disposed directly in front of the robot is the largest, an RSSI collected by a positioning module opposite to the positioning module disposed directly in front of the robot in the same set and disposed directly in rear of the robot is the smallest, and a difference between RSSIs collected by positioning modules disposed on left and right sides of the robot is relatively smaller. That is, a difference between RSSIs collected by the positioning module closest to the target device and the positioning module farthest from the target device and opposite to the positioning module closest to the target device is the largest. Therefore, in the present disclosure, the target positioning module can be determined based on the positioning parameters collected by the set of positioning modules with the largest RSSI difference.

In an example, a positioning module with a larger RSSI among the set of positioning modules with the largest RSSI difference may be determined as the target positioning module, that is, the positioning module closest to the target device is used as the target positioning module, so as to ensure that positioning information collected by this positioning module has the highest accuracy among all positioning modules. The target positioning module is a positioning module configured to acquire the positioning parameter of the target device. The positioning module with the larger RSSI among the set of positioning modules with the largest RSSI difference indicates that the positioning module with the larger RSSI is closer to the target device than the other positioning module among the set of positioning modules with the largest RSSI difference, that is to say, the larger RSSI, the closer to the target device.

In step S103, a relative positional relationship between the robot and the target device is determined according to a positioning parameter collected by the target positioning module.

In an example, a plurality of sets of positioning parameters with the target positioning module as a local coordinate system can be obtained based on AOA technologies, such as a straight-line distance between the target device and the target positioning module, an included angle and a pitch angle of the target device in relative to a forward direction of the target positioning module, etc. In addition, the plurality of sets of positioning parameters may further include the RSSI, a Channel Impulse Response (CIR) and other positioning parameters. The relative positional relationship between the target positioning module and the target device may be determined based on a data fusion method. Afterwards, the relative positional relationship between the robot and the target device may be acquired according to a position of the target positioning module in the robot coordinate system.

In the method described in the present disclosure, after the positioning parameter collected by each positioning module is acquired, the target positioning module is determined based on the RSSI difference between the positioning modules in each set to position the target device, so that the robot can select the positioning module with the highest accuracy of the ranging result at present in a case of being provided with the plurality of positioning modules, and uses the positioning parameter collected by this positioning module for positioning, which improves the accuracy of the positioning result of the robot while reducing the setup cost of a robot positioning system.

In some embodiments of the present disclosure, as shown in FIG. 2, the determining the target positioning module based on the positioning parameters collected by the set of positioning modules with the largest RSSI difference may specifically include steps S102A to S102B. The step S102B may be specifically divided into three cases of S102B-1 to S102B-3.

In the step S102A, it is determined whether an AOA collected by a positioning module with a larger RSSI among the set of positioning modules with the largest RSSI difference is within a measurement range.

The AOA represents a horizontal angle between a forward direction of each positioning module and the target device. The measurement range represents an angular interval in which an error value between an AOA collected by a positioning module and an actual AOA is smaller than a preset error value, that is, an angular interval in which the positioning module can achieve the precise measurement.

Specifically, comparison results between AOAs collected by each positioning module on the robot in different positions relative to the target device and actual AOAs may be determined through experiments, so as to determine the measurement range of each positioning module.

In the step 102B-1, in response to the AOA being within the measurement range, that is, the target device is currently in the precise measurement angle interval of the positioning module with the larger RSSI among the set of positioning modules with the largest RSSI difference, the positioning module with the larger RSSI among the set of positioning modules with the largest RSSI difference may be determined as the target positioning module.

In the step S102B-2, in response to the AOA exceeding a left angle upper limit of the measurement range, that is, the target device is currently on the left of the precise measurement angle interval of the positioning module with the larger RSSI among the set of positioning modules with the largest RSSI difference, a left positioning module adjacent to the positioning module with the larger RSSI among the set of positioning modules with the largest RSSI difference may be determined as the target positioning module.

In the step S102B-3, in response to the AOA exceeding a right angle upper limit of the measurement range, that is, the target device is currently on the right of the precise measurement angle interval of the positioning module with the larger RSSI among the set of positioning modules with the largest RSSI difference, a right positioning module adjacent to the positioning module with the larger RSSI among the set of positioning modules with the largest RSSI difference may be determined as the target positioning module.

In the method described in the present disclosure, it is ensured that the AOA between the target device and the current positioning module is always within the measurement range, so that the positioning module with the highest accuracy of the ranging result at present locates the target device, which further improves the positioning result accuracy of the robot.

In some embodiments of the present disclosure, a priority of each set of positioning modules may further be determined in advance based on the measurement range of each set of positioning modules.

Specifically, based on experimental data, the inventors of the present disclosure acquired, in a case that the robot is provided with a first positioning module in the front, a second positioning module in the rear, a third positioning module on the left and a fourth positioning module on the right, a measurement range result of each positioning module, which is specifically shown in FIG. 3.

FIG. 3 shows a mapping relationship between an AOA collected by each positioning module of the robot and an actual AOA, where the abscissa is the AOA collected by the positioning module, and the ordinate is the actual AOA. A straight line with a slope K=1 in the figure represents an ideal AOA mapping relationship, that is, the AOA collected by the positioning module is completely consistent with the actual AOA. It can be seen from FIG. 3 that:

a measurement range of the first positioning module in front of the robot is (−48°, 60°);

a measurement range of the second positioning module in rear of the robot is (−60°, 60°); and for the third positioning module on the left of the robot and the fourth positioning module on the right of the robot, due to the large fluctuation in AOA, the measurement range cannot be accurately acquired, and the approximate measurement range is much smaller than those of the first positioning module and the second positioning module.

That is to say, the total measurement range of the first positioning module in the front and the second positioning module in the rear disposed opposite to each other in which the precise angle measurement can be realized is much larger than that of the third positioning module on the left and the fourth positioning module on the right disposed opposite to each other. The first positioning module and the second positioning module may be set as a first priority, and the third positioning module and the fourth positioning module may be set as a second priority.

After the priority of each set of positioning modules is determined, a comparison result between an RSSI difference of a set of positioning modules at each priority and a first threshold can be determined according to the priority from high to low, until a set of positioning modules whose RSSI difference is greater than the first threshold is determined, and the target positioning module is determined based on the positioning parameters collected by the set of positioning modules whose RSSI difference is greater than the first threshold.

Illustratively, in response to an RSSI difference between the first priority positioning modules being greater than the first threshold (e.g., 7 db), the target positioning module is determined according to the positioning parameters collected by the first positioning module and the second positioning module;

in response to the RSSI difference between the first priority positioning modules being not greater than the first threshold, which indicates that the first priority positioning modules cannot accurately acquire the positioning parameters at present, a comparison result between the RSSI difference between the second priority positioning modules and the first threshold is then determined;

in response to the RSSI difference between the second priority positioning modules being greater than the first threshold, the target positioning module is determined according to the positioning parameters collected by the third positioning module and the fourth positioning module; and in response to the RSSI difference of the set of positioning modules at each priority being not greater than the first threshold at present, a ranging abnormal signal can be transmitted to a robot processor to wait for subsequent instructions sent by the processor.

Figure 4:
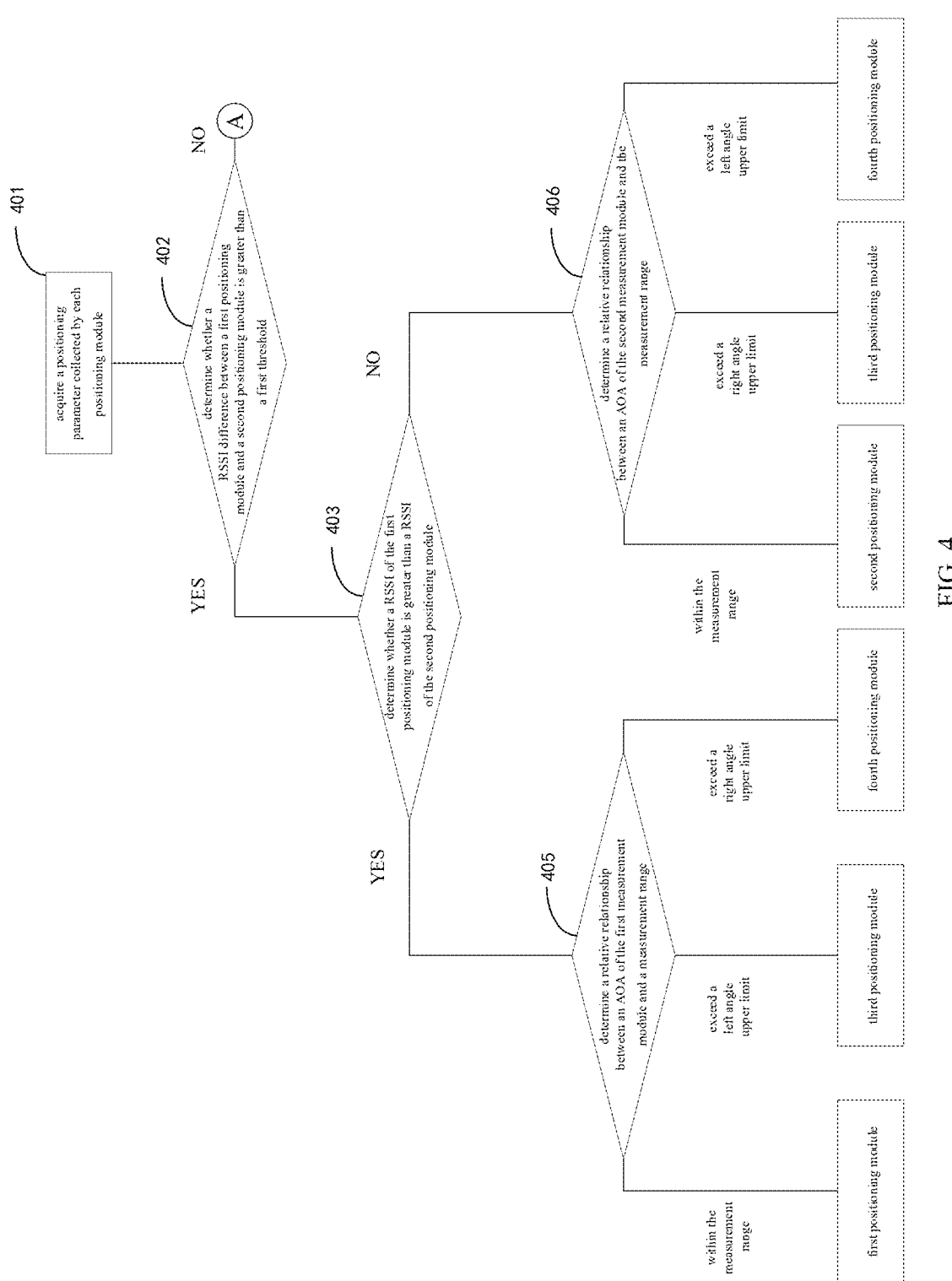
FIG. 4 is a flowchart showing another positioning method according to an embodiment of the present disclosure.
Figure 4:
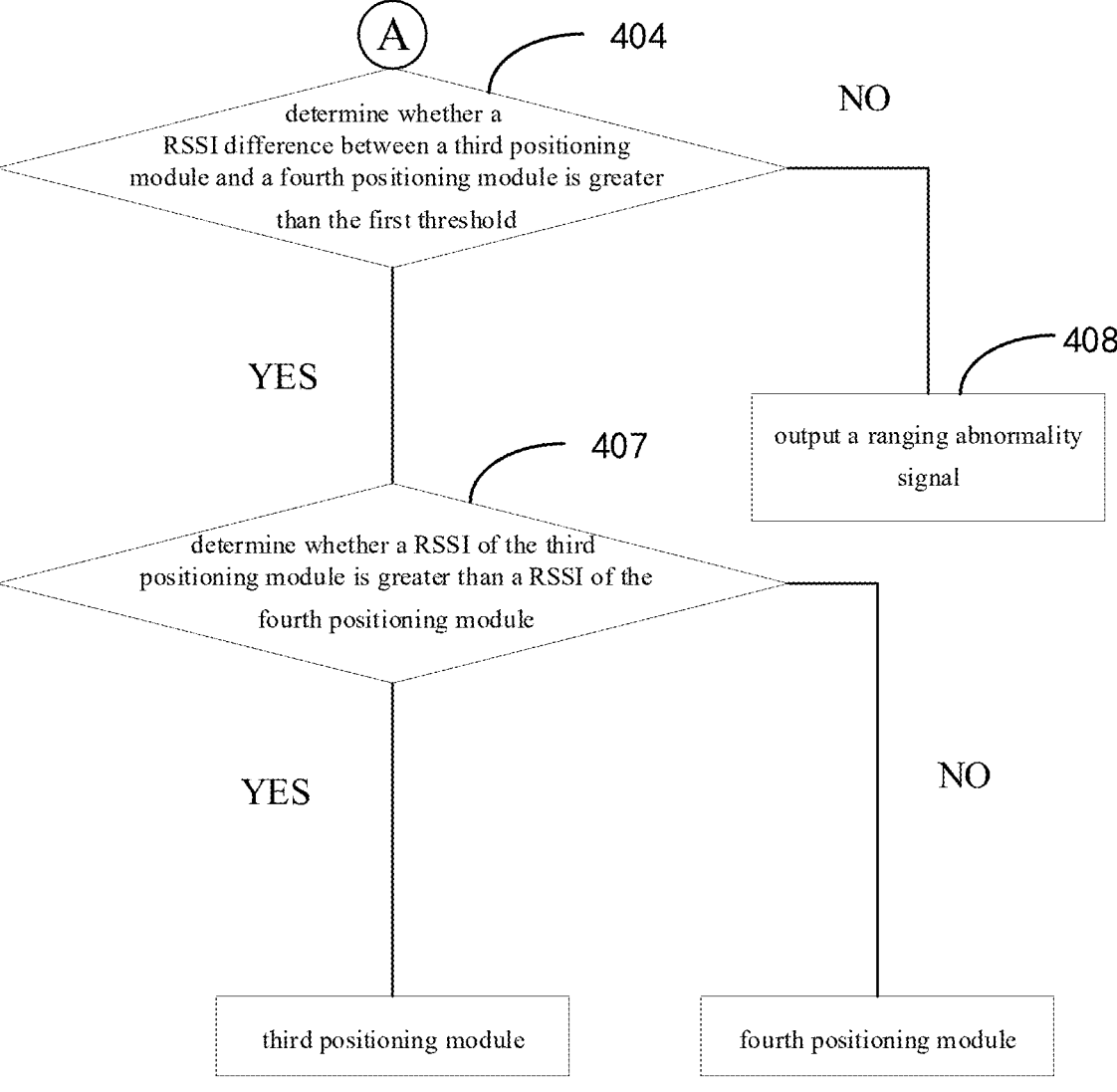

Specifically, FIG. 4 shows a flowchart of another positioning method according to an embodiment of the present disclosure, where the robot includes a first positioning module in the front, a second positioning module in the rear, a third positioning module on the left and a fourth positioning module on the right.

In step S401, a positioning parameter collected by each positioning module is acquired.

In step S402, it is determined whether an RSSI difference between the first positioning module and the second positioning module is greater than a first threshold, if so, then step S403 is executed, and if not, then step S404 is executed.

In the step S403, it is determined whether an RSSI of the first positioning module is greater than an RSSI of the second positioning module, if so, then step S405 is executed, and if not, then step S406 is executed.

In the step S405, a relative relationship between an AOA of the first measurement module and a measurement range is determined:

in response to the AOA being in the measurement range, the first positioning module is determined as the target positioning module;

in response to the AOA exceeding a left angle upper limit of the measurement range, the third positioning module is determined as the target positioning module; and in response to the AOA exceeding a right angle upper limit of the measurement range, the fourth positioning module is determined as the target positioning module.

In the step S406, a relative relationship between an AOA of the second measurement module and the measurement range is determined:

in response to the AOA being in the measurement range, the second positioning module is determined as the target positioning module;

in response to the AOA exceeding the left angle upper limit of the measurement range, the fourth positioning module is determined as the target positioning module; and in response to the AOA exceeding the right angle upper limit of the measurement range, the third positioning module is determined as the target positioning module.

In the step S404, it is determined whether an RSSI difference between the third positioning module and the fourth positioning module is greater than the first threshold, if so, then step S407 is executed, and if not, then step S408 is executed.

In the step S407, in response to an RSSI of the third positioning module being greater than an RSSI of the fourth positioning module, the third positioning module is determined as the target positioning module, otherwise the fourth positioning module is determined as the target positioning module.

In the step S408, a ranging abnormality signal is transmitted to a robot processor.

In the method described in the present disclosure, based on the pre-divided positioning module priorities, the target positioning module is determined according to the positioning parameter collected by the positioning module at each priority in turn, so that the robot can preferentially use the positioning module with higher positioning accuracy to position the target device, which improves the positioning result accuracy of the robot and the decision-making efficiency for the selection of the positioning module.

For the foregoing respective method embodiments, they are expressed as a series of action combinations for the sake of simple description. However, those skilled in the art should know that the present disclosure is not limited by the described action sequence, since certain steps may be performed in other orders or simultaneously according to the present disclosure.

Moreover, those skilled in the art should also know that embodiments described in the specification are all optional embodiments, and actions and modules involved are not necessarily required by the present disclosure.

Corresponding to the aforementioned embodiments of the method for implementing application functions, the present disclosure also provides embodiments of a device for implementing application functions and a corresponding terminal.

Figure 5:
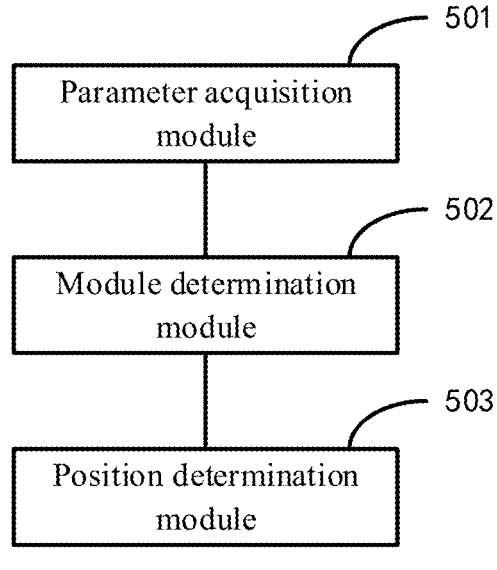
FIG. 5 is a schematic diagram showing a positioning device according to an embodiment of the present disclosure.

A block diagram of a positioning device illustrated by an embodiment of the present disclosure is shown in FIG. 5, and the positioning device is applied to a robot. A plurality of sets of positioning modules opposite to each other are provided around the robot, and the positioning modules are provided with directional antennas, and maintain interactive connections with a target device based on positioning parameters. The device includes:

a parameter acquisition module 501, configured to acquire a positioning parameter collected by each positioning module, wherein the positioning parameter includes a Received Signal Strength Indicator (RSSI);

a module determination module 502, configured to acquire an RSSI difference between positioning modules in each set, and determine a target positioning module based on positioning parameters collected by a set of positioning modules with a largest RSSI difference; and a position determination module 503, configured to determine a relative positional relationship between the robot and the target device according to a positioning parameter collected by the target positioning module.

In combination with any implementation of the present disclosure, when determining the target positioning module based on the set of positioning modules with the largest RSSI difference, the module determination module is specifically configured to:

determine, as the target positioning module, a positioning module with a larger RSSI among the set of positioning modules with the largest RSSI difference.

In combination with any implementation of the present disclosure, the positioning parameter further includes an Angle Of Arrival (AOA) between a forward direction of each positioning module and the target device;

the device further includes a measurement range determination module, configured to:

determine a measurement range of each positioning module according to a comparison result between an AOA collected by each positioning module and an actual AOA; and wherein the measurement range represents an angle interval in which an error between the AOA collected by the positioning module and the actual AOA is smaller than a preset error value.

In combination with any implementation of the present disclosure, when determining the target positioning module based on the set of positioning modules with the largest RSSI difference, the module determination module is specifically configured to:

determine whether an AOA collected by a positioning module with a larger RSSI among the set of positioning modules with the largest RSSI difference is within the measurement range;

in response to the AOA being within the measurement range, determine, as the target positioning module, the positioning module with the larger RSSI among the set of positioning modules with the largest RSSI difference;

in response to the AOA exceeding a left angle upper limit of the measurement range, determine, as the target positioning module, a left positioning module adjacent to the positioning module with the larger RSSI among the set of positioning modules with the largest RSSI difference; and in response to the AOA exceeding a right angle upper limit of the measurement range, determine, as the target positioning module, a right positioning module adjacent to the positioning module with the larger RSSI among the set of positioning modules with the largest RSSI difference.

In combination with any implementation of the present disclosure, the device further includes a priority determination module, configured to:

determine a priority of each set of positioning modules based on the measurement range of each set of positioning modules;

when determining the target positioning module based on the set of positioning modules with the largest RSSI difference, the module determination module is specifically configured to:

determine a comparison result between an RSSI difference of a set of positioning modules at each priority and a first threshold according to the priority from high to low, until a set of positioning modules whose RSSI difference is greater than the first threshold is determined, and determine the target positioning module based on positioning parameters collected by the set of positioning modules whose RSSI difference is greater than the first threshold.

In combination with any implementation of the present disclosure, the robot includes a first positioning module in front, a second positioning module in rear, a third positioning module on left and a fourth positioning module on right;

the first positioning module and the second positioning module represent first priority positioning modules; and the third positioning module and the fourth positioning module represent second priority positioning modules.

In combination with any implementation of the present disclosure, when determining the comparison result between the RSSI difference of the set of positioning modules at each priority and the first threshold according to the priority from high to low, until the set of positioning modules whose RSSI difference is greater than the first threshold is determined, and determining the target positioning module based on the positioning parameters collected by the set of positioning modules whose RSSI difference is greater than the first threshold, the module determination module is specifically configured to:

in response to an RSSI difference between the first priority positioning modules being greater than the first threshold, determine the target positioning module according to positioning parameters collected by the first positioning module and the second positioning module; or in response to the RSSI difference between the first priority positioning modules being not greater than the first threshold, and an RSSI difference between the second priority positioning modules being greater than the first threshold, determine the target positioning module according to positioning parameters collected by the third positioning module and the fourth positioning module.

In combination with any implementation of the present disclosure, in response to the RSSI difference of the set of positioning modules at each priority being not greater than the first threshold, the device further includes an abnormality reporting module, configured to:

transmit a ranging abnormality signal to a robot processor.

In combination with any implementation of the present disclosure, the positioning module includes an Ultra-Wideband (UWB) module provided with a directional antenna.

Details regarding the device embodiments, since they basically correspond to the method embodiments, the relevant parts can be referred to the description of the method embodiments. The device embodiments described above are only illustrative. The units described as separated parts may or may not be physically separated, and the parts displayed as units may or may not be physical units, that is, the units may be located in one place, or may be distributed over multiple network units. Some or all of the modules may be selected according to actual needs to achieve the objectives of the solutions in the present disclosure. Those of ordinary skill in the art can understand and implement the present disclosure without paying creative labor.

Figure 6:
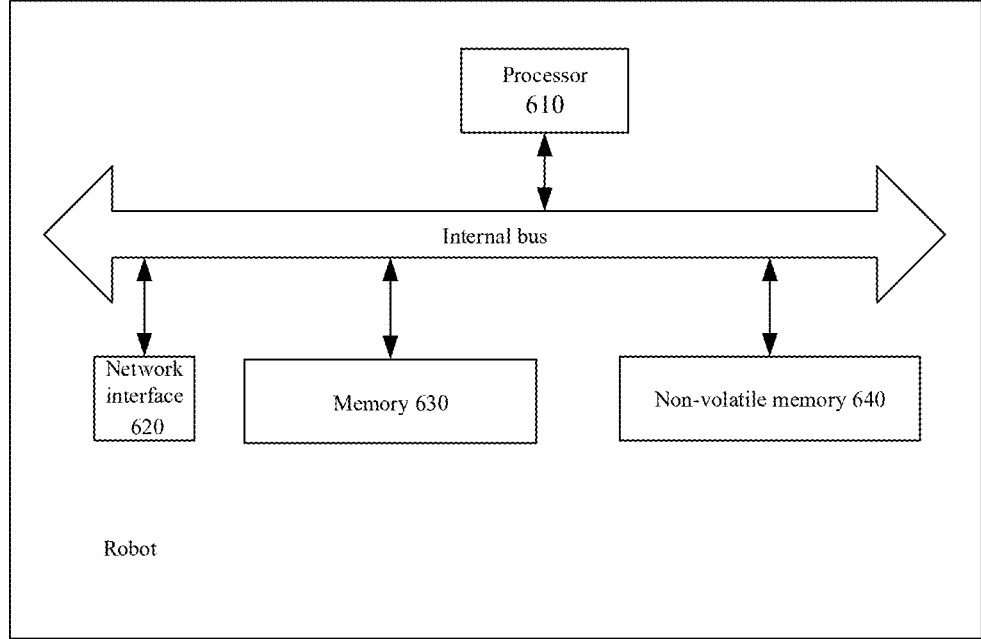
FIG. 6 is a diagram showing a hardware structure of a robot according to an embodiment of the present disclosure.

Embodiments of the positioning device of the present specification may be applied to a robot, such as a robot processor. The device embodiments may be implemented by software, hardware or a combination of hardware and software. Taking software implementation as an example, a device in a logical sense is formed by reading corresponding computer program instructions in a non-volatile memory into a memory to be executed through a processor for positioning where it is located. In terms of hardware, FIG. 6 shows a hardware structure diagram of a robot where the positioning device of embodiments of the present specification is located. In addition to a processor 610, a memory 630, a network interface 620, and a non-volatile memory 640 shown in FIG. 6, a server or an electronic device where the device in embodiments is located may generally include other hardware according to the actual function of the computer device, which will not be described in detail herein.

The present disclosure provides a positioning method, a device, a robot and a readable storage medium.

According to a first aspect of the present disclosure, there is provided a positioning method, which is applied to a robot. A plurality of sets of positioning modules opposite to each other are provided around the robot, and the positioning module is provided with a directional antenna, and maintains an interactive connection with a target device based on a positioning parameter. The method includes:

acquiring a positioning parameter collected by each positioning module, wherein the positioning parameter includes a Received Signal Strength Indicator (RSSI);

acquiring an RSSI difference between positioning modules in each set, and determining a target positioning module based on positioning parameters collected by a set of positioning modules with a largest RSSI difference; and determining a relative positional relationship between the robot and the target device according to a positioning parameter collected by the target positioning module.

In combination with any implementation of the present disclosure, the determining the target positioning module based on the set of positioning modules with the largest RSSI difference includes:

determining, as the target positioning module, a positioning module with a larger RSSI among the set of positioning modules with the largest RSSI difference.

In combination with any implementation of the present disclosure, the positioning parameter further includes an Angle Of Arrival (AOA) between a forward direction of each positioning module and the target device;

the method further includes:

determining a measurement range of each positioning module according to a comparison result between an AOA collected by each positioning module and an actual AOA; and wherein the measurement range represents an angle interval in which an error between the AOA collected by the positioning module and the actual AOA is smaller than a preset error value.

In combination with any implementation of the present disclosure, the determining the target positioning module based on the positioning parameters collected by the set of positioning modules with the largest RSSI difference includes:

determining whether an AOA collected by a positioning module with a larger RSSI among the set of positioning modules with the largest RSSI difference is within the measurement range;

in response to the AOA being within the measurement range, determining, as the target positioning module, the positioning module with the larger RSSI among the set of positioning modules with the largest RSSI difference;

in response to the AOA exceeding a left angle upper limit of the measurement range, determining, as the target positioning module, a left positioning module adjacent to the positioning module with the larger RSSI among the set of positioning modules with the largest RSSI difference; and in response to the AOA exceeding a right angle upper limit of the measurement range, determining, as the target positioning module, a right positioning module adjacent to the positioning module with the larger RSSI among the set of positioning modules with the largest RSSI difference.

In combination with any implementation of the present disclosure, the method further includes:

determining a priority of each set of positioning modules based on a measurement range of each set of positioning modules;

the determining the target positioning module based on the positioning parameters collected by the set of positioning modules with the largest RSSI difference includes:

determining a comparison result between an RSSI difference of a set of positioning modules at each priority and a first threshold according to the priority from high to low, until a set of positioning modules whose RSSI difference is greater than the first threshold is determined, and determining the target positioning module based on positioning parameters collected by a set of positioning modules whose RSSI difference is greater than the first threshold.

In combination with any implementation of the present disclosure, the robot includes a first positioning module in front, a second positioning module in rear, a third positioning module on left and a fourth positioning module on right;

the first positioning module and the second positioning module represent first priority positioning modules; and the third positioning module and the fourth positioning module represent second priority positioning modules.

In combination with any implementation of the present disclosure, the determining the comparison result between the RSSI difference of the set of the positioning modules at each priority and the first threshold according to the priority from high to low, until a set of positioning modules whose RSSI difference is greater than the first threshold is determined, and determining the target positioning module based on the positioning parameters collected by the set of positioning modules whose RSSI difference is greater than the first threshold includes:

in response to an RSSI difference between the first priority positioning modules being greater than the first threshold, determining the target positioning module according to positioning parameters collected by the first positioning module and the second positioning module; or in response to the RSSI difference between the first priority positioning modules being not greater than the first threshold, and an RSSI difference between the second priority positioning modules being greater than the first threshold, determining the target positioning module according to positioning parameters collected by the third positioning module and the fourth positioning module.

In combination with any implementation of the present disclosure, in response to the RSSI difference of the set of positioning modules at each priority being not greater than the first threshold, the method further includes:

transmitting a ranging abnormality signal to a robot processor.

In combination with any implementation of the present disclosure, the positioning module includes an Ultra-Wideband (UWB) module provided with a directional antenna.

According to a second aspect of the present disclosure, there is provided a positioning device, which is applied to a robot. A plurality of sets of positioning modules opposite to each other are provided around the robot, and the positioning module is provided with a directional antenna, and maintains an interactive connection with a target device based on a positioning parameter. The device includes:

a parameter acquisition module, configured to acquire a positioning parameter collected by each positioning module, wherein the positioning parameter includes a Received Signal Strength Indicator (RSSI);

a module determination module, configured to acquire an RSSI difference between positioning modules in each set, and determine a target positioning module based on positioning parameters collected by a set of positioning modules with a largest RSSI difference; and a position determination module, configured to determine a relative positional relationship between the robot and the target device according to a positioning parameter collected by the target positioning module.

In combination with any implementation of the present disclosure, when determining the target positioning module based on the set of positioning modules with the largest RSSI difference, the module determination module is specifically configured to:

determine, as the target positioning module, a positioning module with a larger RSSI among the set of positioning modules with the largest RSSI difference.

In combination with any implementation of the present disclosure, the positioning parameter further includes an Angle Of Arrival (AOA) between a forward direction of each positioning module and the target device;

the device further includes a measurement range determination module, configured to:

determine a measurement range of each positioning module according to a comparison result between an AOA collected by each positioning module and an actual AOA; and wherein the measurement range represents an angle interval in which an error between the AOA collected by the positioning module and the actual AOA is smaller than a preset error value.

In combination with any implementation of the present disclosure, when determining the target positioning module based on the set of positioning modules with the largest RSSI difference, the module determination module is specifically configured to:

determine whether an AOA collected by a positioning module with a larger RSSI among the set of positioning modules with the largest RSSI difference is within the measurement range;

in response to the AOA being within the measurement range, determine, as the target positioning module, the positioning module with the larger RSSI among the set of positioning modules with the largest RSSI difference;

in response to the AOA exceeding a left angle upper limit of the measurement range, determine, as the target positioning module, a left positioning module adjacent to the positioning module with the larger RSSI among the set of positioning modules with the largest RSSI difference; and in response to the AOA exceeding a right angle upper limit of the measurement range, determine, as the target positioning module, a right positioning module adjacent to the positioning module with the larger RSSI among the set of positioning modules with the largest RSSI difference.

In combination with any implementation of the present disclosure, the device further includes a priority determination module, configured to:

determine a priority of each set of positioning modules based on the measurement range of each set of positioning modules;

when determining the target positioning module based on the set of positioning modules with the largest RSSI difference, the module determination module is specifically configured to:

determine a comparison result between an RSSI difference of a set of positioning modules at each priority and a first threshold according to the priority from high to low, until a set of positioning modules whose RSSI difference is greater than the first threshold is determined, and determine the target positioning module based on positioning parameters collected by a set of positioning modules whose RSSI difference is greater than the first threshold.

In combination with any implementation of the present disclosure, the robot includes a first positioning module in front, a second positioning module in rear, a third positioning module on left and a fourth positioning module on right;

the first positioning module and the second positioning module represent first priority positioning modules; and the third positioning module and the fourth positioning module represent second priority positioning modules.

In combination with any implementation of the present disclosure, when determining the comparison result between the RSSI difference of the set of positioning modules at each priority and the first threshold according to the priority from high to low, until a set of positioning modules whose RSSI difference is greater than the first threshold is determined, and determining the target positioning module based on the positioning parameters collected by the set of positioning modules whose RSSI difference is greater than the first threshold, the module determination module is specifically configured to:

in response to an RSSI difference between the first priority positioning modules being greater than the first threshold, determine the target positioning module according to positioning parameters collected by the first positioning module and the second positioning module; or in response to the RSSI difference between the first priority positioning modules being not greater than the first threshold, and an RSSI difference between the second priority positioning modules being greater than the first threshold, determine the target positioning module according to positioning parameters collected by the third positioning module and the fourth positioning module.

In combination with any implementation of the present disclosure, in response to the RSSI difference of the set of positioning modules at each priority being not greater than the first threshold, the device further includes an abnormality reporting module, configured to:

transmit a ranging abnormality signal to a robot processor.

In combination with any implementation of the present disclosure, the positioning module includes an Ultra-Wideband (UWB) module provided with a directional antenna.

According to a third aspect of the present disclosure, there is provided a robot, including:

a memory, configured to store executable instructions of a processor; and a processor, configured to execute the executable instructions in the memory to implement steps of the method in any implementation of the first aspect as described above.

According to a fourth aspect of the present disclosure, there is provided a computer-readable storage medium having a computer program stored thereon which, when executed by a processor, implements steps of the method in any implementation of the first aspect as described above.

The technical solutions provided by embodiments of the present disclosure may include beneficial effects:

after the positioning parameter collected by each positioning module is acquired, the target positioning module is determined based on the RSSI difference between the positioning modules in each set to position the target device, so that the robot can select the positioning module with the highest accuracy of the ranging result at present in a case of being provided with the plurality of positioning modules, and uses the positioning parameter collected by this positioning module for positioning, which improves the accuracy of the positioning result of the robot while reducing the setup cost of a robot positioning system.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A positioning method, performed by a robot, comprising:

acquiring, by a robot, a positioning parameter collected by at least one positioner, wherein the positioning parameter comprises a Received Signal Strength Indicator (RSSI), and a plurality of sets of positioners opposite to each other are provided around the robot, the robot is provided with the plurality of sets of the positioners, and the at least one positioner is provided with a directional antenna, and maintains an interactive connection with a target device based on the positioning parameter;

acquiring, by the robot, an RSSI difference between positioners in at least one set of the plurality of sets of the positioners, and determining, by the robot, a target positioner based on positioning parameters collected by a set of the plurality of sets of the positioners with a largest RSSI difference; and determining, by the robot, a relative positional relationship between the robot and a target device to be positioned according to a positioning parameter collected by the target positioner.

2. The method according to claim 1, wherein determining the target positioner based on the positioning parameters collected by the set of the plurality of sets of the positioners with the largest RSSI difference comprises:

determining, as the target positioner, a positioner with a larger RSSI among the set of the plurality of sets of the positioners with the largest RSSI difference.

3. The method according to claim 1, wherein the positioning parameter further comprises an Angle Of Arrival (AOA) between a forward direction of the at least one positioner and the target device;

the method further comprises:

determining a measurement range of the at least one positioner according to a comparison result between an AOA collected by the at least one positioner and an actual AOA, wherein:

the measurement range represents an angle interval in which an error value between the AOA collected by the at least one positioner and the actual AOA is smaller than a preset error value.

4. The method according to claim 3, wherein determining the target positioner based on the positioning parameters collected by the set of the plurality of sets of the positioners with the largest RSSI difference comprises:

determining whether an AOA collected by a positioner with a larger RSSI among the set of the plurality of sets of the positioners with the largest RSSI difference is within the measurement range;

in response to determining that the AOA is within the measurement range, determining, as the target positioner, the positioner with the larger RSSI among the set of the plurality of sets of the positioners with the largest RSSI difference;

in response to determining that the AOA exceeds a left angle upper limit of the measurement range, determining, as the target positioner, a left positioner adjacent to the positioner with the larger RSSI among the set of the plurality of sets of the positioners with the largest RSSI difference; and in response to determining that the AOA exceeds a right angle upper limit of the measurement range, determining, as the target positioner, a right positioner adjacent to the positioner with the larger RSSI among the set of the plurality of sets of the positioners with the largest RSSI difference.

5. The method according to claim 3, further comprising:

determining a priority of the at least one set of the plurality of sets of the positioners based on a measurement range of the at least one set of the plurality of sets of the positioners; and wherein:

determining the target positioner based on the positioning parameters collected by the set of the plurality of sets of the positioners with the largest RSSI difference comprises:

determining a comparison result between an RSSI difference of a set of the plurality of sets of the positioners at at least one priority and a first threshold according to the at least one priority from high to low, until a set of the plurality of sets of the positioners whose RSSI difference is greater than the first threshold is determined; and determining the target positioner based on positioning parameters collected by the set of the plurality of sets of the positioners whose RSSI difference is greater than the first threshold.

6. The method according to claim 5, wherein the robot comprises a first positioner in front, a second positioner in rear, a third positioner on left and a fourth positioner on right;

the first positioner and the second positioner represent first priority positioners; and the third positioner and the fourth positioner represent second priority positioners.

7. The method according to claim 6, wherein the determining the comparison result between the RSSI difference of the set of the plurality of sets of the positioners at the at least one priority and the first threshold according to the at least one priority from high to low, until the set of the plurality of sets of the whose RSSI difference is greater than the first threshold is determined, and determining the target positioner based on the positioning parameters collected by the set of the plurality of sets of the positioners whose RSSI difference is greater than the first threshold comprises:

in response to determining that an RSSI difference between the first priority positioners is greater than the first threshold, determining the target positioner according to positioning parameters collected by the first positioner and the second positioner; or in response to determining that the RSSI difference between the first priority positioners is not greater than the first threshold, and an RSSI difference between the second priority positioners is greater than the first threshold, determining the target positioner according to positioning parameters collected by the third positioner and the fourth positioner.

8. The method according to claim 5, wherein in response to determining that the RSSI difference of the set of the plurality of sets of the positioners at the at least one priority is not greater than the first threshold, the method further comprises:

transmitting a ranging abnormality signal to a robot processor.

9. The method according to claim 1, wherein the at least one positioner comprises an Ultra-Wideband (UWB) module provided with the directional antenna.

10. A robot, comprising:

a memory configured to store processor executable instructions; and a processor, configured to execute the processor executable instructions in the memory to implement:

acquiring a positioning parameter collected by at least one positioner, wherein the positioning parameter comprises a Received Signal Strength Indicator (RSSI), and a plurality of sets of positioners opposite to each other are provided around the robot, the robot is provided with the plurality of sets of the positioners, and the at least one positioner is provided with a directional antenna, and maintains an interactive connection with a target device based on the positioning parameter;

acquiring an RSSI difference between positioners in at least one set of the plurality of sets of the positioners, and determining a target positioner based on positioning parameters collected by a set of the plurality of sets of the positioners with a largest RSSI difference; and determining a relative positional relationship between the robot and a target device to be positioned according to a positioning parameter collected by the target positioner.

11. The robot according to claim 10, wherein the processor is further configured to:

determine, as the target positioner, a positioner with a larger RSSI among the set of the plurality of sets of the positioners with the largest RSSI difference.

12. The robot according to claim 10, wherein the positioning parameter further comprises an Angle Of Arrival (AOA) between a forward direction of the at least one positioner and the target device;

the processor is further configured to:

determine a measurement range of the at least one positioner according to a comparison result between an AOA collected by the at least one positioner and an actual AOA, wherein:

the measurement range represents an angle interval in which an error value between the AOA collected by the at least one positioner and the actual AOA is smaller than a preset error value.

13. The robot according to claim 12, wherein the processor is further configured to:

determine whether an AOA collected by a positioner with a larger RSSI among the set of the plurality of sets of the positioners with the largest RSSI difference is within the measurement range;

in response to determining that the AOA is within the measurement range, determining, as the target positioner, the positioner with the larger RSSI among the set of the plurality of sets of the positioners with the largest RSSI difference;

in response to determining that the AOA exceeds a left angle upper limit of the measurement range, determine, as the target positioner, a left positioner adjacent to the positioner with the larger RSSI among the set of the plurality of sets of the positioners with the largest RSSI difference; and in response to determining that the AOA exceeds a right angle upper limit of the measurement range, determine, as the target positioner, a right positioner adjacent to the positioner with the larger RSSI among the set of the plurality of sets of the positioners with the largest RSSI difference.

14. The robot according to claim 12, wherein the processor is further configured to:

determine a priority of the at least one set of the plurality of sets of the positioners based on a measurement range of the at least one set of the plurality of sets of the positioners; and the processor is further configured to:

determine a comparison result between an RSSI difference of a set of the plurality of sets of the positioners at at least one priority and a first threshold according to the at least one priority from high to low, until a set of the plurality of sets of the positioners whose RSSI difference is greater than the first threshold is determined; and determining the target positioner based on positioning parameters collected by the set of the plurality of sets of the positioners whose RSSI difference is greater than the first threshold.

15. The robot according to claim 14, wherein the robot comprises a first positioner in front, a second positioner in rear, a third positioner on left and a fourth positioner on right;

the first positioner and the second positioner represent first priority positioners; and the third positioner and the fourth positioner represent second priority positioners.

16. The robot according to claim 15, wherein the processor is further configured to:

in response to determining that an RSSI difference between the first priority positioners is greater than the first threshold, determine the target positioner according to positioning parameters collected by the first positioner and the second positioner; or in response to determining that the RSSI difference between the first priority positioners is not greater than the first threshold, and an RSSI difference between the second priority positioners being greater than the first threshold, determine the target positioner according to positioning parameters collected by the third positioner and the fourth positioner.

17. The robot according to claim 14, wherein the processor is further configured to:

transmit a ranging abnormality signal to a robot processor.

18. The robot according to claim 10, wherein the at least one positioner comprises an Ultra-Wideband (UWB) module provided with the directional antenna.

19. A non-transitory computer-readable storage medium storing a plurality of programs for execution by a robot having one or more processors, wherein the plurality of programs, when executed by the one or more processors, cause the robot to perform acts comprising:

acquiring a positioning parameter collected by at least one positioner, wherein the positioning parameter comprises a Received Signal Strength Indicator (RSSI), and a plurality of sets of positioners opposite to each other are provided around the robot, the robot is provided with the plurality of sets of the positioners, and the at least one positioner is provided with a directional antenna, and maintains an interactive connection with a target device based on the positioning parameter;

acquiring an RSSI difference between positioners in at least one set of the plurality of sets of the positioners, and determining a target positioner based on positioning parameters collected by a set of the plurality of sets of the positioners with a largest RSSI difference; and determining a relative positional relationship between the robot and a target device to be positioned according to a positioning parameter collected by the target positioner.

20. The non-transitory computer-readable storage medium according to claim 19, wherein the plurality of programs, when executed by the one or more processors, cause the robot further to:

determine, as the target positioner, a positioner with a larger RSSI among the set of the plurality of sets of the positioners with the largest RSSI difference.

* * * * *